United States Patent
Blagodurov et al.

(10) Patent No.: US 11,656,796 B2
(45) Date of Patent: May 23, 2023

(54) ADAPTIVE MEMORY CONSISTENCY IN DISAGGREGATED DATACENTERS

(71) Applicant: Advanced Micro Devices, Inc., Santa Clara, CA (US)

(72) Inventors: Sergey Blagodurov, Bellevue, WA (US); Brandon K. Potter, Austin, TX (US); Johnathan Alsop, Seattle, WA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 81 days.

(21) Appl. No.: 17/219,505

(22) Filed: Mar. 31, 2021

(65) Prior Publication Data

US 2022/0317927 A1 Oct. 6, 2022

(51) Int. Cl.
 *G06F 3/06* (2006.01)
 *G06F 9/30* (2018.01)
 *G06F 9/38* (2018.01)

(52) U.S. Cl.
 CPC ............ *G06F 3/0659* (2013.01); *G06F 3/067* (2013.01); *G06F 3/0658* (2013.01); *G06F 9/30087* (2013.01); *G06F 9/3838* (2013.01); *G06F 3/0604* (2013.01)

(58) Field of Classification Search
 CPC ...... G06F 3/0659; G06F 3/0658; G06F 3/067; G06F 9/30087; G06F 9/3838; G06F 3/0604
 See application file for complete search history.

(56) References Cited

U.S. PATENT DOCUMENTS

| | | | | |
|---|---|---|---|---|
| 6,889,319 | B1* | 5/2005 | Rodgers | G06F 9/3855 712/228 |
| 7,454,580 | B2* | 11/2008 | Arimilli | G06F 9/3851 711/216 |
| 9,513,975 | B2 | 12/2016 | Jones et al. | |
| 2012/0174083 | A1* | 7/2012 | Shpeisman | G06F 8/443 717/154 |
| 2014/0282566 | A1 | 9/2014 | Lindholm et al. | |

(Continued)

FOREIGN PATENT DOCUMENTS

WO 2010116151 A1 10/2010

OTHER PUBLICATIONS

Kimberly Keeton; Memory-Driven Computing; Mar. 2019; Hewlett Packard Enterprise Company; pp. 1-60 (Year: 2019).*

(Continued)

*Primary Examiner* — Idriss N Alrobaye
*Assistant Examiner* — Richard B Franklin
(74) *Attorney, Agent, or Firm* — Polansky & Associates, P.L.L.C.; Paul J. Polansky; Nathan H. Calvert

(57) ABSTRACT

A data processor includes a fabric-attached memory (FAM) interface for coupling to a data fabric and fulfilling memory access instructions. A requestor-side adaptive consistency controller coupled to the FAM interface requests notifications from a fabric manager for the fabric-attached memory regarding changes in requestors authorized to access a FAM region which the data processor is authorized to access. If a notification indicates that more than one requestor is authorized to access the FAM region, fences are activated for selected memory access instructions in a local application.

27 Claims, 6 Drawing Sheets

(56) References Cited

U.S. PATENT DOCUMENTS

2019/0278494 A1   9/2019   Dev et al.

OTHER PUBLICATIONS

Sharad Singhal and Kim Keeton; OpenFAM an API for programming Fabric Attached Memory; Apr. 11, 2018; Hewlett Packard Enterprise Company; pp. 1-64 (Year: 2018).*

Kimberly Keeton, Sharad Singhal, Haris Volos; OpenFAM API: programming model for disaggregated persistent memory; 2018; Hewlett Packard Enterprise Company; pp. 1-21 (Year: 2018).*

"Redfish Composability DSP2050"; white paper; DMTF, 1050 SW 6th Avenue, #1100, Portland, OR 97204; United States; Version 1.2.0; 2017; 35 pages.

International Search Report and Written Opinion for International Application No. PCT/US2022/020607, dated Jun. 17, 2022, 9 pages.

Abdennacer Khelaifa et al., "A comparative analysis of adaptive consistency approaches in cloud storage"; Journal of Parallel and Distributed Computing, vol. 129, pp. 36-49; Mar. 25, 2019; 14 pages.

* cited by examiner

ADAPTIVE MEMORY CONSISTENCY IN DISAGGREGATED DATACENTERS

BACKGROUND

Emerging fabric standards such as Compute Express Link (CXL) 3.0, Gen-Z, or Slingshot exemplify an approach to datacenter disaggregation in which a central processing unit (CPU) host is able to access Fabric-Attached Memory (FAM) modules. Such modules contain memory attached to the datacenter fabric with no or few compute capabilities associated with it. With FAM, hosts are not constrained with the memory capacity limitations of their local servers. Instead, hosts gain access to vast pools of memory which need not be attached to any particular host. The FAM is partitioned among the hosts, and partitions may be dedicated to a host or shared among multiple hosts.

Memory consistency is an important consideration in the process of developing software applications for use with FAM systems. Consistency defines how the memory instructions (to different memory locations) in a multi-processor or multi-threaded system will be ordered, and is implemented by reordering independent memory operations according to a consistency model.

Various consistency models have developed that impose various ordering constraints on independent memory operations in a single processor's instruction stream where high level dependence is involved. In a simple consistency model, known as Sequential Consistency, the processor is not allowed to reorder reads and writes. Another model, known as "Total Store Order" (TSO), allows store buffering. In this scheme, a store buffer holds store operations that need to be sent to memory until designated conditions are met and a group of operations can be sent to memory. Loads are allowed to pass stores, but the stores are sent to memory in program order. The address of a load operation is checked against addresses in the store buffer, and the store buffer is used to satisfy the load operation if there is an address match.

Other consistency models known as relaxed or weak consistency models rely on some version of a fence (or barrier) operation that demarcates regions within which reordering of operations is permissible. Release consistency is one example of weak consistency model, where synchronization accesses are divided into "Acquire", in which operations like lock must complete before all following memory accesses, and "Release", in which operations like unlock must complete with all memory operations before release are complete.

Figure 1:
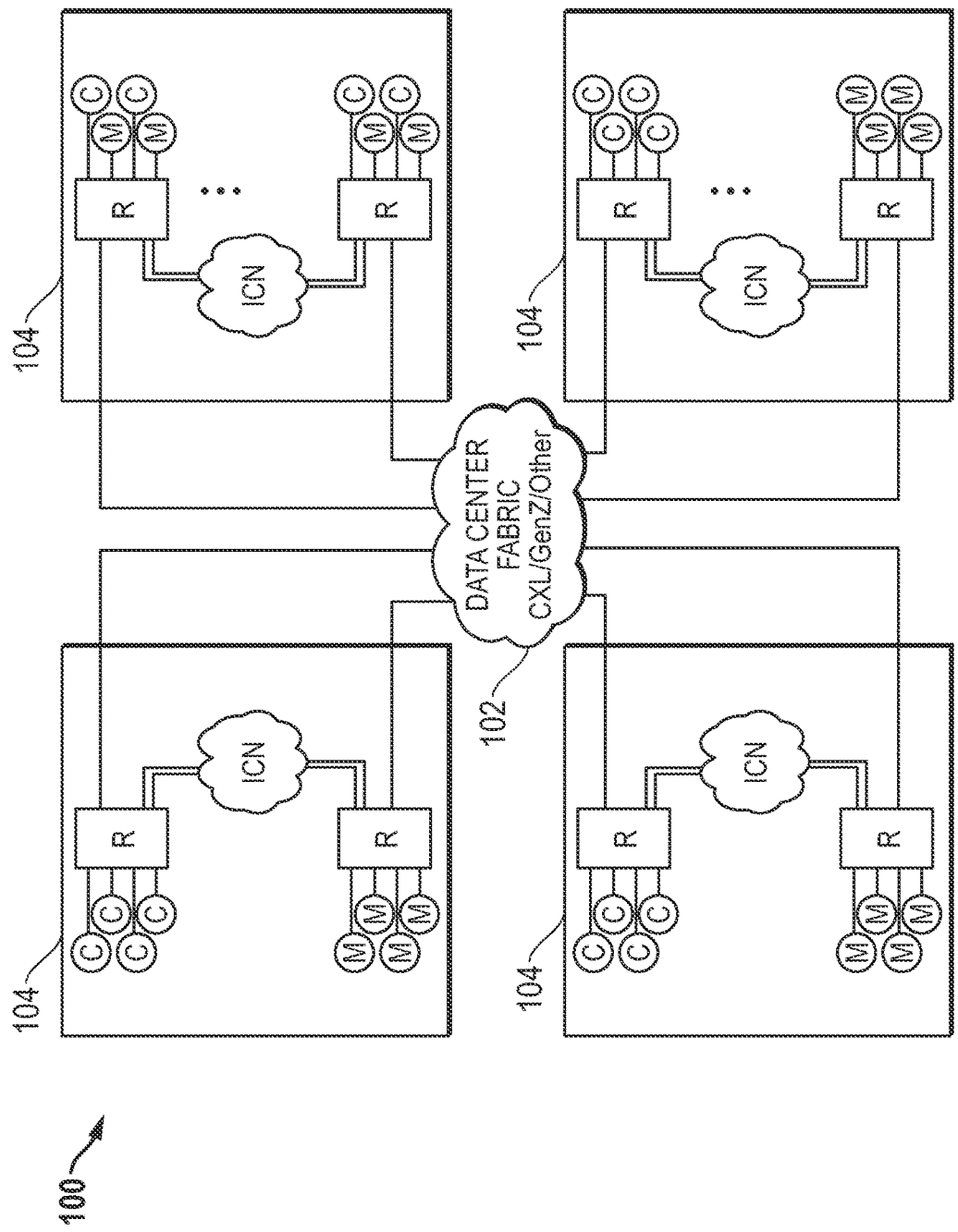
FIG. 1 illustrates in block diagram form a fabric-attached memory (FAM) system according to the prior art.

In the following description, the use of the same reference numerals in different drawings indicates similar or identical items. Unless otherwise noted, the word "coupled" and its associated verb forms include both direct connection and indirect electrical connection by means known in the art, and unless otherwise noted any description of direct connection implies alternate embodiments using suitable forms of indirect electrical connection as well.

DETAILED DESCRIPTION OF ILLUSTRATIVE EMBODIMENTS

A method is for use with a fabric-attached memory system including a fabric-attached memory and a plurality of requestors coupled to the fabric-attached memory through a fabric. Notifications are requested from a fabric manager regarding changes in requestors authorized to access a fabric-attached memory region. In response to a notification from the fabric manager indicating that more than one requestor is authorized to access the fabric-attached memory region, for each requestor so authorized, fences are activated for selected memory access instructions in a local application concerning the fabric-attached memory region.

A data processor includes a processing core, a fabric-attached memory interface, and a requestor-side adaptive consistency controller. The processing core executes an application. The fabric-attached memory interface is coupled to the processor core and adapted to connect to a data fabric and fulfill memory access instructions from the processing core to a fabric-attached memory. The requestor-side adaptive consistency controller is coupled to the processing core and the fabric-attached memory interface and requests notifications from a fabric manager for the fabric-attached memory regarding changes in requestors authorized to access a fabric-attached memory region which the data processor is authorized to access. Responsive to a notification from the fabric manager indicating that more than one requestor is authorized to access the fabric-attached memory region, the requestor-side adaptive consistency controller causes fences to be activated for selected memory access instructions in a local application.

A fabric-attached memory system includes a fabric-attached memory, a data fabric, a fabric manager, and a plurality of data processors. The data fabric is connected to the fabric-attached memory. The fabric manager is connected to the data fabric and operable to authorize and deauthorize requestors to access memory regions of the fabric-attached memory. The plurality of data processors are connected to the data fabric and each including a processing core executing an application, a fabric-attached memory interface, and a requestor-side adaptive consistency controller coupled to the processing core and the fabric-attached memory interface. The requestor-side adaptive consistency controller request notifications from the fabric manager regarding changes in requestors authorized to access a fabric-attached memory region which the data processor is authorized to access. Responsive to a notification from the fabric manager indicating that more than one requestor is authorized to access the fabric-attached memory region, the requestor-side adaptive consistency controller causes fences to be activated for selected memory access instructions in a local application.

FIG. 1 illustrates in block diagram form a fabric-attached memory (FAM) system 100 according to the prior art. The depicted FAM system 100 is merely one example of a data fabric topology among many topologies that are often employed for disaggregated data centers. FAM system 100 generally includes a data center fabric 102, and a number of device groups 104 referred to as pods.

Each pod 104 contains multiple compute nodes "C", multiple memory nodes "M", and an interconnect network "ICN". Compute nodes C are connected to the ICN through routers "R". Compute nodes C contain multiple CPUs (multiple cores each) or multiple accelerated processing units (APUs) that are part of the same consistency domain. Each compute node C contains a fabric bridge such as a network interface card (NIC), CXL interface, or other suitable fabric interface that is a gateway into datacenter fabric 102 for the compute note C. Memory nodes M are connected to the ICN through routers R. Each memory node M includes a similar fabric interface and a media controller that satisfies the requests to FAM. The ICN includes switches for interconnecting the various compute nodes C with memory nodes M, and may include routers in some topologies.

The depicted topology includes a local datacenter fabric formed by routers R and the ICN, and a global data center fabric labeled data center fabric 102. In this embodiment, the local data center fabric is within a rack, and the global data center fabric includes multiple racks. However, various fabric topologies may be implemented within a rack or within a datacenter, and may include compute nodes accessing the datacenter remotely through a network. It is noted that many topologies have compute nodes C that also include memory which is part of the FAM pool. Such memory may be mapped as fabric-attached memory and made available for use by other compute nodes according to a resource allocation process referred to as "composability".

Data center fabric 102 provides data interconnect between pods 104, including switches and routers coupling data traffic in a protocol such as CXL, Gen-Z, or other suitable memory fabric protocol. It is noted that multiple protocols may be employed together in a data center fabric. In this exemplary embodiment, CXL is employed to interconnect devices within a rack, while Gen-Z is employed to interconnect various racks within the data center.

Figure 2:
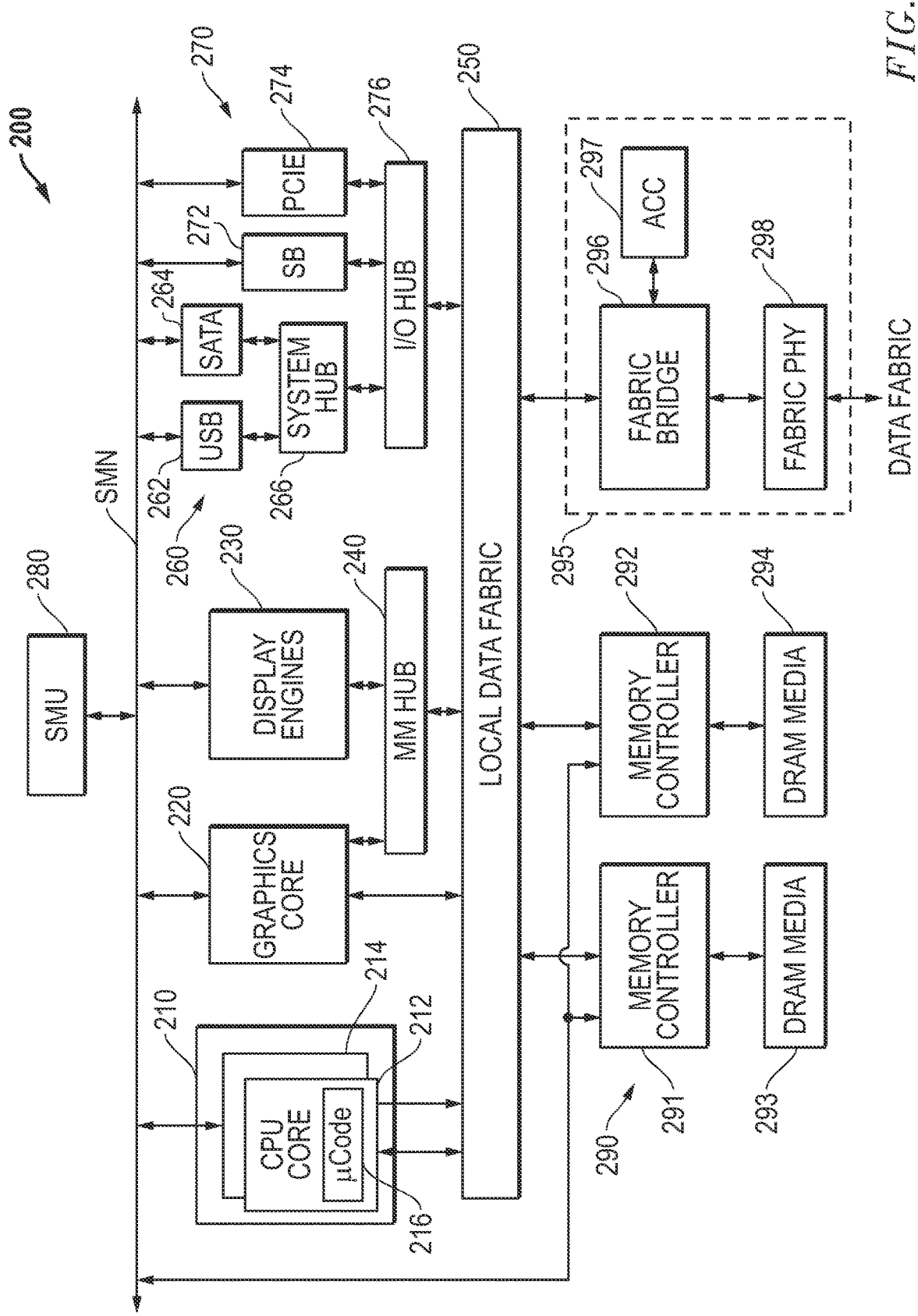
FIG. 2 illustrates in block diagram form an accelerated processing unit (APU) which is suitable for use as a compute unit in a FAM system such as that of FIG. 1 according to some embodiments.

FIG. 2 illustrates in block diagram form an APU 200 which is suitable for use as a compute unit C in a FAM system such as FAM system 100 of FIG. 1. APU 200 is an integrated circuit suitable for use as a processor in a host data processing system, and includes generally a central processing unit (CPU) core complex 210, a graphics core 220, a set of display engines 222, a data fabric 225, a memory management hub 240, a set of peripheral controllers 260, a set of peripheral bus controllers 270, and a system management unit (SMU) 280, and a group of memory interfaces 290.

CPU core complex 210 includes a CPU core 212 and a CPU core 214. In this example, CPU core complex 210 includes two CPU cores, but in other embodiments CPU core complex 210 can include an arbitrary number of CPU cores. Each of CPU cores 212 and 214 is bidirectionally connected to a system management network (SMN), which forms a control fabric, and to local data fabric 225, and is capable of providing memory access requests to data fabric 225. Each of CPU cores 212 and 214 may be unitary cores, or may further be a core complex with two or more unitary cores sharing certain resources such as caches. Each of CPU cores 212 and 214 includes μCode 216 which runs to execute certain instructions on the CPU, including performing certain functions for memory consistency on a data center fabric as further described below.

Graphics core 220 is a high performance graphics processing unit (GPU) capable of performing graphics operations such as vertex processing, fragment processing, shading, texture blending, and the like in a highly integrated and parallel fashion. Graphics core 220 is bidirectionally connected to the SMN and to data fabric 225, and is capable of providing memory access requests to data fabric 225. In this regard, APU 200 may either support a unified memory architecture in which CPU core complex 210 and graphics core 220 share the same memory space, or a memory architecture in which CPU core complex 210 and graphics core 220 share a portion of the memory space, while graphics core 220 also uses a private graphics memory not accessible by CPU core complex 210. Memory regions may be assigned from local memory or a data center fabric.

Display engines 222 render and rasterize objects generated by graphics core 220 for display on a monitor. Graphics core 220 and display engines 222 are bidirectionally connected to common memory management hub 240 for uniform translation into appropriate addresses in system memory.

Local data fabric 250 includes a crossbar switch for routing memory access requests and memory responses between any memory accessing agent and memory management hub 240. It also includes a system memory map, defined by basic input/output system (BIOS), for determining destinations of memory accesses based on the system configuration, as well as buffers for each virtual connection.

Peripheral controllers 260 include a universal serial bus (USB) controller 262 and a Serial Advanced Technology Attachment (SATA) interface controller 264, each of which is bidirectionally connected to a system hub 266 and to the SMN bus. These two controllers are merely exemplary of peripheral controllers that may be used in APU 200.

Peripheral bus controllers 270 include a system controller or "Southbridge" (SB) 272 and a Peripheral Component Interconnect Express (PCIe) controller 274, each of which is bidirectionally connected to an input/output (I/O) hub 276 and to the SMN bus. I/O hub 276 is also bidirectionally connected to system hub 266 and to data fabric 225. Thus for example a CPU core can program registers in USB controller 262, SATA interface controller 264, SB 272, or PCIe controller 274 through accesses that data fabric 225 routes through I/O hub 276. Software and firmware for APU 200 are stored in a system data drive or system BIOS memory (not shown) which can be any of a variety of non-volatile memory types, such as read-only memory (ROM), flash electrically erasable programmable ROM (EEPROM), and the like. Typically, the BIOS memory is accessed through the PCIe bus, and the system data drive through the SATA interface.

SMU 280 is a local controller that controls the operation of the resources on APU 200 and synchronizes communication among them. SMU 280 manages power-up sequencing of the various processors on APU 200 and controls multiple off-chip devices via reset, enable and other signals. SMU 280 includes one or more clock sources (not shown), such as a phase locked loop (PLL), to provide clock signals for each of the components of APU 200. SMU 280 also manages power for the various processors and other functional blocks, and may receive measured power consumption values from CPU cores 212 and 214 and graphics core 220 to determine appropriate power states.

Memory management hub 240 is connected to local data fabric 250, graphics core 220 and display engines 230 for providing direct memory access capability to graphics core 220 and display engines 230.

Memory interfaces 290 include two memory controllers 291 and 292, DRAM media 293 and 294, and a FAM memory interface 295. Each of memory controllers 291 and 292 are connected to local data fabric 250 and connected to a respective one of DRAM media 293 and 294 through a physical layer (PHY) interface. In this embodiment, DRAM media 293 and 294 include memory modules based on based on DDR memories such as DDR version five (DDR5). In other embodiments, other types of DRAM memory are used, such as low power DDR4 (LPDDR4), graphics DDR version five (GDDR5), and high bandwidth memory (HBM).

FAM memory interface 295 includes a fabric bridge 296, an adaptive consistency controller (ACC) 297, and a fabric PHY 298. Fabric bridge 296 is a fabric-attached memory interface connected to local data fabric 250 for receiving and fulfilling memory requests to a FAM system such as FAM system 100. Such memory requests may come from CPU core complex 210 or may be direct memory access (DMA) requests from other system components such as graphics core 220. Fabric bridge 296 is also bidirectionally connected to fabric PHY 298 to provide the connection of APU 200 to the data center fabric. An adaptive consistency controller (ACC) 297 is bidirectionally connected to fabric bridge 296 for providing memory consistency control inputs to fabric bridge 296 and CPU core complex 210, as further described below. In operation, ACC 297 communicates with CPU cores in CPU core complex 210 to receive notifications that designated memory access instructions have been recognized by µCode 216 running on CPU cores 212 and 214, as further described below. ACC 297 also provides configuration inputs to CPU core complex 210 for configuring memory consistency models.

Figure 3:
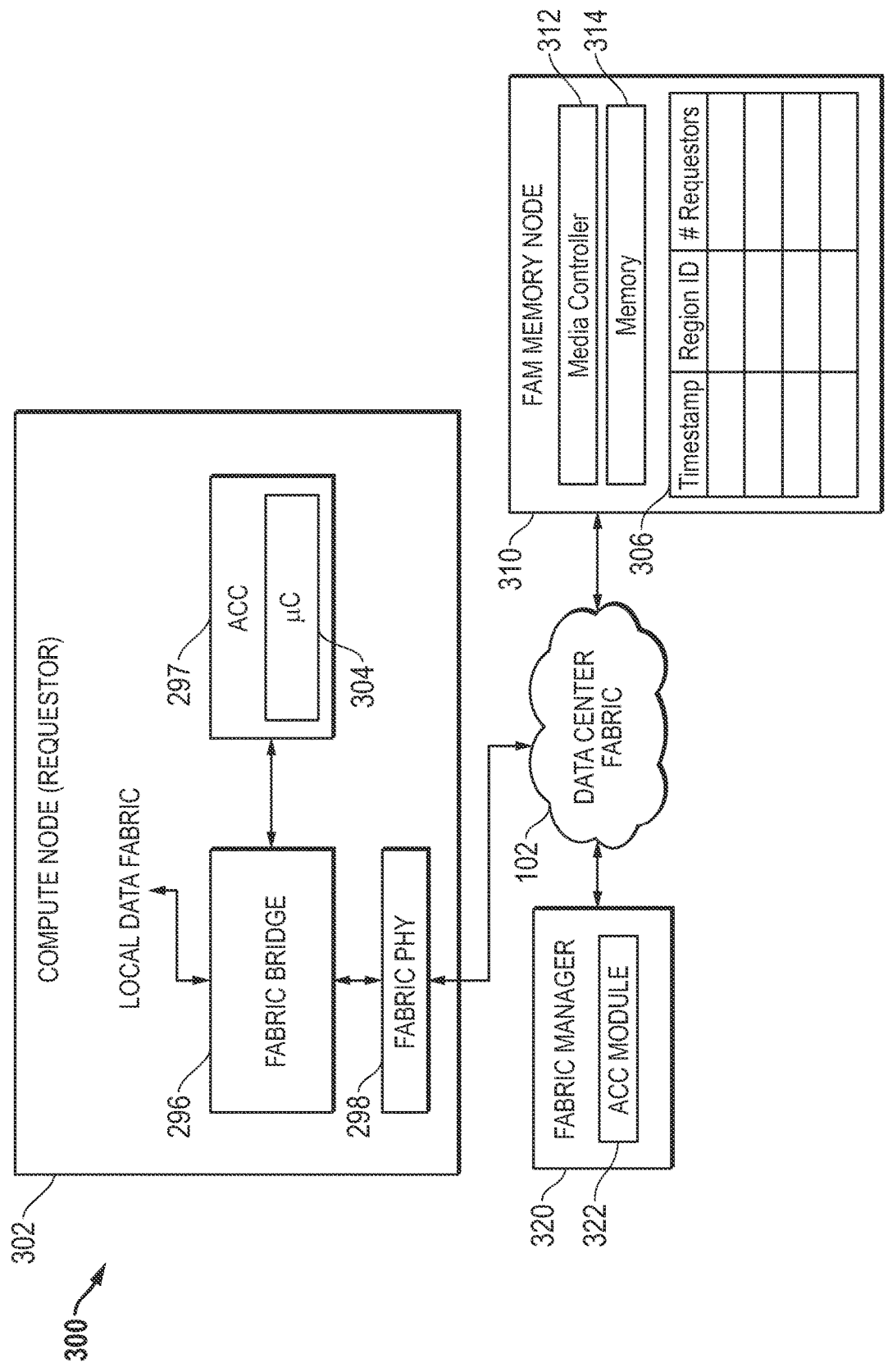
FIG. 3 illustrates in block diagram form certain elements of a FAM memory system including an adaptive consistency controller (ACC) according to some embodiments.

FIG. 3 illustrates in block diagram form certain elements of a FAM system 300 according to some embodiments. FAM system 300 generally includes a compute node 302, data center fabric 102, FAM memory node 310, and fabric manager 320.

Compute node 302 is one of many requestor compute nodes connected to data center fabric 102 and generally is implemented with an APU such as APU 200. Compute node 302 can implement an internet server, an application server, a supercomputing node, or another suitable computing node that benefits from accessing a FAM. Only the FAM interface components of compute node 302 are depicted in order to focus on the relevant portions of the system. Compute node 302 includes fabric bridge 296, fabric PHY 298, and ACC 297.

Fabric bridge 296 is connected to the local data fabric as described above with respect to FIG. 2, and to fabric PHY 298 and ACC 297. ACC 297 in this version includes a microcontroller (µC) 304. The µC 304 performs memory consistency control functions as described below, and is typically also connected to a tangible non-transitory memory for holding firmware to initialize and configure µC 304 to perform its functionality.

The µC 304 performs memory consistency control functions as described below, and is typically also connected to a tangible non-transitory memory for holding firmware to initialize and configure µC 304 to perform its functionality.

Fabric manager 320 is a controller connected to data center fabric 102 for managing configuration and access to FAM system 300. Fabric manager 320 executes a data fabric management application for the particular standard employed on data center fabric 102, such as CXL or Gen-Z. The data fabric management application manages and configures data center fabric functions such as authorizing compute nodes, allocating memory regions, and managing composability by identifying and configuring memory resources among the various nodes in FAM system 300. It is noted that while one FAM memory node 310 and one compute node 302 are shown, the system includes multiple such nodes which can appear in many configurations such as the example configuration depicted in FIG. 1. In some embodiments, fabric manager 320 has an adaptive consistency controller (ACC) module 322 installed for accessing the data fabric management application and reporting data to each ACC 297 on respective compute nodes throughout FAM system 300.

FAM memory node 310 includes a media controller 312 and a memory 314. Media controller 312 typically includes a memory controller suitable for whatever type of memory is selected for use in memory 314. For example, if memory 314 is a DRAM memory, a DRAM memory controller is used. Memory 314 may also include persistent memory modules and mixed. In some embodiments, ACC 297 maintains data in requestor table 306 at FAM memory node 310 concerning other requestors authorized to access a FAM memory region allocated to compute node 302. Requestor table 306 tracks updates to the compute nodes authorized to access the same memory region, and includes fields for a "Timestamp" reflecting the time of the update, a "Region ID" reflecting an identifier for the FAM memory region allocated to compute node 302, and a "#Requestors" reflecting the number of requestors on FAM system 300 that were authorized to access the memory region as of each update. Requestor table 306 is updated based on reporting from fabric manager 320 as further described below. In this embodiment, FAM memory node 310 includes a buffer accessable by media controller 312 holding requestor table 306.

Figure 4:
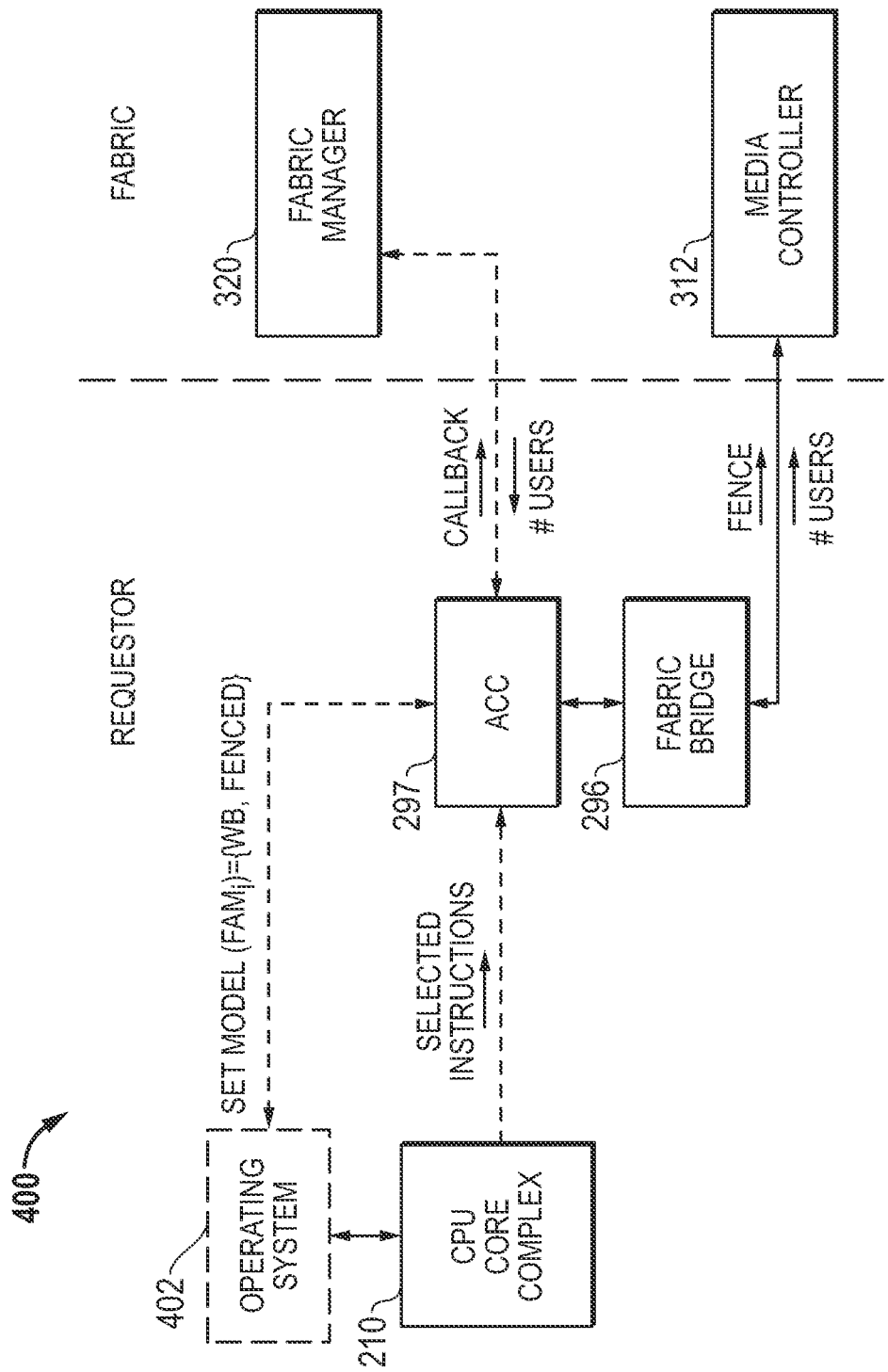
FIG. 4 shows a diagram illustrating a process of operating the ACC of FIG. 3 according to some embodiments.

FIG. 4 shows a diagram 400 illustrating a process of operating an ACC 297 according to some embodiments. Diagram 400 depicts activity at a requestor compute node at the data fabric, and shows CPU core complex 210, an operating system 402, ACC 297, and fabric bridge 296 at the requestor compute node. Diagram 400 also shows fabric manager 320 and a media controller 312, which is one of many media controllers on the data fabric.

When the requestor is assigned a particular FAM region to use for system memory by fabric manager 320, ACC 297 makes a callback request to fabric manager 320 to request notifications when changes are made to the number of requestors which authorized to use the same memory region as the requestor compute node, as shown by the outgoing request labeled "CALLBACK". Fabric manager 320 provides a notification back to ACC 297 each time the number of requestors authorized to use the memory region changes, as indicated by the "#USERS" response on diagram 400. In this embodiment, the requestor table 306 (FIG. 3) at FAM memory node 310 is updated each time the number of users changes, as indicated on diagram 400 by the "#Users" arrow going to media controller 312. In some embodiments, ACC 287 maintains a requestor table in a buffer local to ACC 297. In some embodiments, ACC module 322 (FIG. 3) running at fabric manager 320 manages the process of monitoring requestors authorized to access the memory region and sending notifications to ACC 297. Based on the #USERS update notifications, ACC 297 sets a consistency model for use with the assigned FAM memory region. Generally this process includes, when the current requestor is the only requestor authorized to access the memory region, setting a the consistency model to a first consistency model, and when more than one requestor is authorized to access the memory region, setting the consistency model to a second consistency model. Setting the consistency model is shown by the command "SET MODEL (FAM$_i$)=(WB, FENCED)", where "FAM$_i$" identifies the fabric-attached memory region concerned, and "WB, FENCED" indicates which consistency model is to be activated. In some embodiments, the first consistency mode is characterized as being relaxed with respect to the second consistency model. An example of this process is further described below with respect to FIG. 5.

In diagram 400, μCode 216 (FIG. 2) running at CPU core complex 210 helps to implement the second consistency model when it is active. Specifically, μCode 216 recognizes designated memory access instructions in an application executing at CPU core complex 210 which indicate data fencing is needed for designated memory instructions concerning the fabric-attached memory region assigned to the requestor node. The μCode 216 has a variety of ways to recognize the designated instructions as further described below with respect to FIG. 6 and FIG. 7. When such an instruction is recognized, μCode 216 communicates with the ACC 297 to send notifications identifying the selected instructions which will be sent to the data fabric through fabric bridge 296. ACC 297 then adds fence commands to the command stream going to media controller 312 as indicated by the outgoing arrow labeled "FENCE". When the first consistency model is active, μCode 216 will not make such notifications and instead will allow the selected commands to execute normally with memory consistency handled by the first consistency model set with operating system 402. While in this embodiment μCode 216 recognizes the designated instructions, in other embodiments this function is performed by CPU firmware or a combination of CPU firmware and μCode.

While the diagram shows fence commands going to media controller 312, in topologies including a local datacenter fabric and a global datacenter fabric, ACC 297 will causes fence commands to be sent to media controllers on both the local datacenter fabric and the global datacenter fabric in scenarios for which the memory region includes accessing both levels of the fabric topology.

Figure 5:
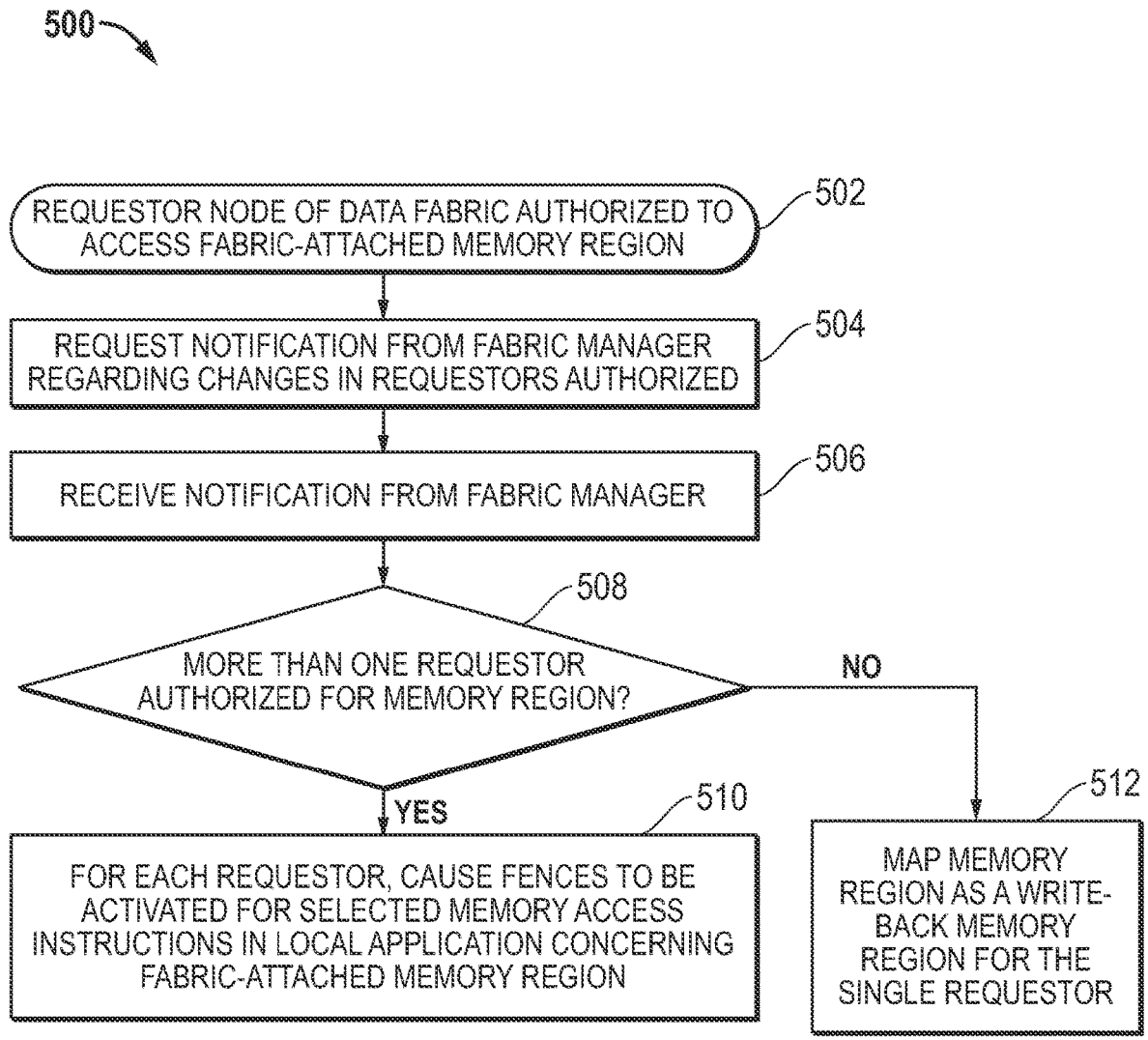
FIG. 5 shows a flowchart of a process for managing memory consistency models at an adaptive consistency controller according to an exemplary embodiment.

FIG. 5 shows a flowchart 500 of a process for managing memory consistency models at an adaptive consistency controller according to an exemplary embodiment. The process begins at block 502 where a requestor node on a data fabric is authorized to access a designated FAM memory region. Such authorization is typically provided by the fabric manager but in some embodiments may be configured by other system components. Based on the authorization the memory region is established in the addressable system memory space of the requestor node. The memory region is typically used for an application running at the requestor node which may have dependencies with other requestor nodes.

At block 504, ACC 297 at the requestor node requests notifications from the fabric manager regarding any changes in the number of requestors authorized to access the particular memory region. In one embodiment, this request has the form of a callback request to the fabric manager to track the number of compute requestors that are accessing the FAM region. ACC module 322 (FIG. 3) may be employed to receive such requests and either implement the request at the fabric manager or configure the fabric manager to implement the request. In other embodiments, the fabric manager may have such capability as part of the fabric manager application and not require an additional module.

At block 506, ACC 297 at the requestor node receives a notification from the fabric manager in response to the request. Based on this notification, ACC 297 determines the number of requestors currently authorized to use the FAM region and updates requestor table 306 (FIG. 3). In some embodiments, the notification includes the data fields used in requestor table 306, including Timestamp, Region ID, and #Requestors. In other embodiments, the fabric manager may not provide all the data instead only provide data indicating that a requestor authorization was added or removed for the FAM region. In such case, ACC 297 will update the data in requestor table 306 based on the current notification data and the previous update to requestor table 306.

At block 508, if more than one requestor is authorized for the memory region, the process goes to block 510. If not, the process goes to block 512. At block 510, the process causes fences to be activated for selected memory access instructions in the local application concerning the FAM region. If at block 508 a transition is made from having only one requestor authorized to more than one, the process includes deactivating the first memory consistency model and activating the second memory consistency model at the requestor node, as described above with respect to FIG. 4. If more than one requestor was already authorized at block 508, then the second memory consistency model is already active and does not need to be changed.

At block 512, the update notification received at block 506 has resulted in a state in which only one requestor is authorized for the FAM region, and so the process activates the first memory consistency model. In some embodiments, the first memory consistency model includes mapping the FAM region as write-back memory for the single requestor. Mapping the FAM region as write-back memory for the local compute node is preferably accomplished by ACC 297 sending appropriate messaging to the operating system running on CPU core complex 210, which then marks the memory page or pages that correspond to the FAM region as write-back in the requestor's page tables. Mapping the FAM region as write-back memory ensures that the normal, local consistency scheme (such as an x86 total-store-order (TSO) consistent scheme) will be applied by the compute node for the FAM region. When only one requestor is authorized for the FAM region, no changes are required to the application's functionality to use FAM rather than local memory. The process of blocks 506, 508, 510, and 512 is repeated each time the fabric manager sends an update notification for the FAM memory region concerned.

Figure 6:
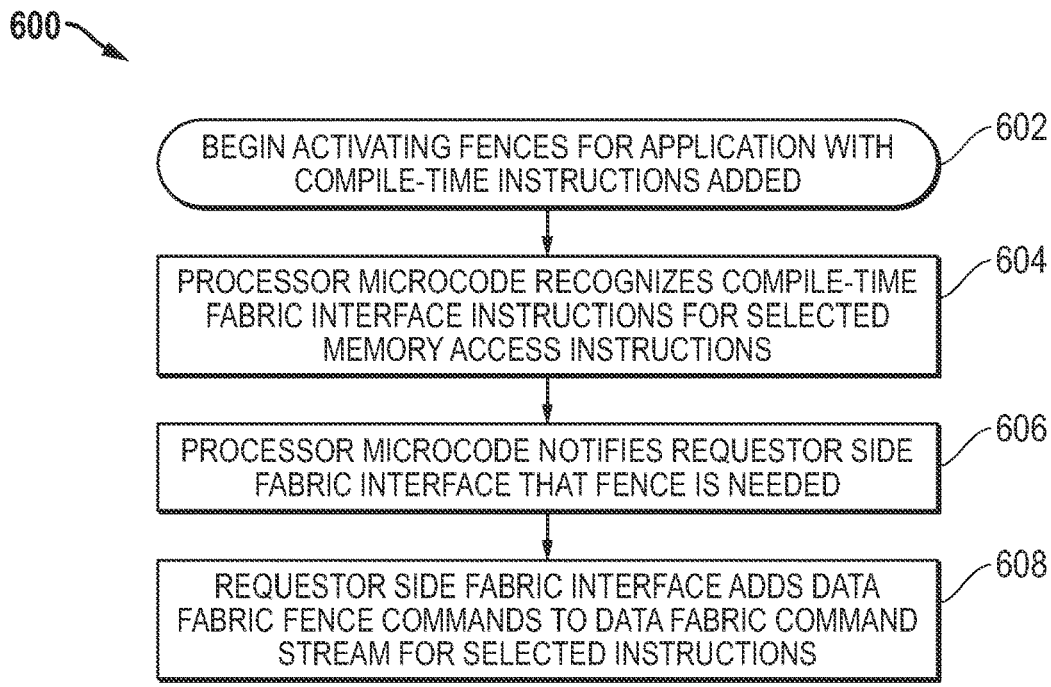
FIG. 6 shows a flowchart of a process for implementing a memory consistency model according to some embodiments.

FIG. 6 shows a flowchart 600 of a process for implementing a memory consistency model according to some embodiments. Generally, applications which are not originally written for use with a FAM system, if they have any dependencies between compute nodes, require modifications in order for the FAM system to properly account for dependencies between compute nodes. Such modifications can be made when compiling the code, or can be applied after-the-fact by adding instructions to selected memory commands in the application. The process of FIG. 6 is performed for applications in which compile-time instructions have been added in order to adapt the application for use with a FAM system. Such applications include applications that are written and compiled with tools for handling consistency in a FAM system, and applications that have been modified with a suitable tool to be adapted for use with a FAM system.

At block 602 the process begins activating fences for an application with compile-time instructions included in the application. Block 602 occurs when ACC 297 changes the consistency model for a compute node to activate the second, more relaxed, consistency model. Generally, data fabric protocols like CXL 3.0 and Gen-Z employ a relaxed-ordering consistency model implemented via fences. When the relaxed consistency model is active, ACC 297 seeks to insert datacenter fabric fences such as CXL/Gen-Z fences in the critical locations transparently to the application code. This transparency means that activity performed by ACC 297 should not require any adjustments by the application concerned.

At block 604, the process recognizes compile-time fabric interface instructions for selected memory access instructions. Generally, the selected memory access instructions are parts of the code such as flags, locks, semaphores, control variables, etc. that perform parallel synchronization in between compute threads, so the memory accesses need to be ordered. The locations of the selected memory access instructions are identified with hints in the application that can be provided by the software developer to the adaptive controller via several mechanisms.

Compiler hints like C++ 11 atomic_load/atomic_store consistency constructs or primitives or runtime hints like OpenMP's flush construct can be integrated with a development tool such as the "CodeAnalyst" tool (by Advanced Micro Devices of Santa Clara, Calif.) to make the consistency hints easier to share for the developer. The compiler inserts requestor-side fabric interface markers such as a special "FABRIC_ACQUIRE_FENCE" instruction before the marked control variable and a special "FABRIC_RELEASE_FENCE" instruction after the control variable. These special instructions or markers are converted to no-operation (NOP) by the CPU's μCode 216 on a non-FAM system or a FAM system with only one requestor node accessing the relevant FAM region, but are recognized at block 604 by μCode 216 when more than one application is authorized to access the relevant FAM region.

Responsive to recognizing such instructions, at block 606 the CPU μCode 216 notifies ACC 297 that a fabric fence is needed for the instruction, as shown by the SELECTED INSTRUCTIONS arrow in FIG. 4. In some embodiments, such notification occurs with a message over the local data fabric from the CPU to ACC 297. The notification includes identifying information for ACC 297 to identify the instruction when it is received over the local data fabric, such as the memory address of the variable concerned. In other embodiments, the notification may be implemented by adding a predetermined flag or marker to the memory access instruction to be modified when the instruction is sent by the CPU over the local data fabric to the fabric bridge 296. In some embodiments, such a marker includes information necessary to determine whether an acquire fence instruction is needed, or a release fence instruction.

At block 608, in response to receiving each notification, ACC 297 will issue acquire/release datacenter fabric fences. These fences are commands inserted into the command stream that goes to the data fabric and on to the media controller for the relevant FAM region, as shown by the FENCE arrow in FIG. 4. The media controller then implements the commands to provide fences for the variables concerned.

While the depicted process occurs after the application is already modified to include FABRIC_ACQUIRE_FENCE and FABRIC_RELEASE_FENCE instructions, in some embodiments the process also includes inserting such hints or markers into the application such that μCode 216 can recognize the selected memory instructions.

Figure 7:
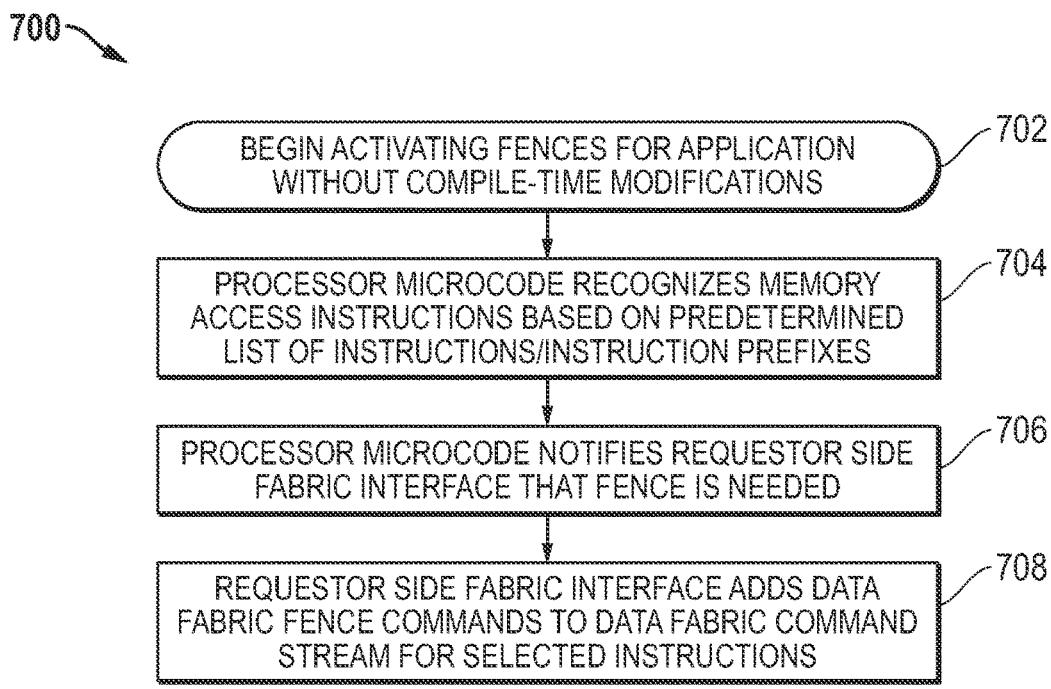
FIG. 7 shows a flowchart of another process for implementing a memory consistency model according to some additional embodiments.

FIG. 7 shows a flowchart 700 of another process for implementing a memory consistency model according to some additional embodiments. The depicted process is performed for applications that are not modified with compile-time instructions for implementing fabric fences. This process has the advantage that applications for which the developers have not provided a version configured for use with FAM system can still be used with a FAM system without causing consistency problems that would ordinarily occur with such use. Another advantage is for deployments in which a separate or more expensive software license is required to obtain an application version for use with a FAM system, the process can enable using the non-FAM version with a FAM system.

At block 702, the process begins activating FAM fences for such an application. Recognizing the selected memory access instructions that need a fence command is different in this process than the process of FIG. 6 because no specific instructions are included in the application for fabric fences. At block 704, the CPU μCode 216 recognizes the memory access instructions in the application for which fences are needed based recognizing instructions in a predetermined list of instruction types and instruction prefixes associated with synchronization of data between threads. In some embodiments, the predetermined list is provided for μCode 216 to cover all types of applications for which it is able to recognize the selected memory access instructions. The list includes instructions and instruction prefixes which are associated with dependencies between applications. For example, this list can include x86's LOCK instruction prefix, X86's xacquire/xrelease, and PowerPC's SYNC instruction.

At block 706, whenever any instruction from this predefined list is invoked, the CPU μCode 216 will notify ACC 297, which will then issue the fabric fence as shown at block 708.

FAM memory interface 295, or any portions thereof, such as ACC 297 or fabric bridge 296, may be described or represented by a computer accessible data structure in the form of a database or other data structure which can be read by a program and used, directly or indirectly, to fabricate integrated circuits. For example, this data structure may be a behavioral-level description or register-transfer level (RTL) description of the hardware functionality in a high level design language (HDL) such as Verilog or VHDL. The description may be read by a synthesis tool which may synthesize the description to produce a netlist including a list of gates from a synthesis library. The netlist includes a set of gates that also represent the functionality of the hardware including integrated circuits. The netlist may then be placed and routed to produce a data set describing geometric shapes to be applied to masks. The masks may then be used in various semiconductor fabrication steps to produce the integrated circuits. Alternatively, the database on the computer accessible storage medium may be the netlist (with or without the synthesis library) or the data set, as desired, or Graphic Data System (GDS) II data.

While particular embodiments have been described, various modifications to these embodiments will be apparent to those skilled in the art. For example, the internal architecture of fabric bridge 296 and ACC 297 may vary in different embodiments. The type of FAM and the FAM protocol employed may also vary. Furthermore, the particular fabric architecture may vary from architectures that provide disaggregation within a data node or a rack of multiple data nodes using a fabric protocol and transport based on PCIe or CXL, to architectures that are able to employ fiber or copper networks connecting between devices and racks in a data center using protocols such Gen-Z. Accordingly, it is intended by the appended claims to cover all modifications of the disclosed embodiments that fall within the scope of the disclosed embodiments.

What is claimed is:

1. A method for use with a fabric-attached memory system including a fabric-attached memory and a plurality of requestors coupled to the fabric-attached memory through a fabric, comprising:
    requesting notifications from a fabric manager regarding changes in requestors authorized to access a fabric-attached memory region; and
    in response to a notification from the fabric manager indicating that more than one requestor is authorized to access the fabric-attached memory region, causing fences to be activated for selected memory access instructions.

2. The method of claim 1, further comprising, in response to a notification from the fabric manager indicating that a single requestor is authorized to access the fabric-attached memory region, mapping the fabric-attached memory region as a write-back memory region for the single requestor.

3. The method of claim 2, further comprising, in response to the notification from the fabric manager indicating that more than one requestor is authorized to access the fabric-attached memory region, for each requestor so authorized:
    if the requestor is configured to issue local fence commands, causing local fence commands to be issued for the selected memory access instructions and mapping the fabric-attached memory region as write-through memory for the requestor; and
    if the requestor is not configured to issue local fence commands, mapping the fabric-attached memory region as uncacheable.

4. The method of claim 1, wherein causing fences to be activated includes, in response to recognizing the selected memory access instructions as indicating dependencies between requestors, causing a requestor-side adaptive consistency controller to add fence commands for the selected memory access instructions.

5. The method of claim 4, wherein recognizing the selected memory access instructions is performed by processor instruction microcode running at each respective requestor authorized to access the fabric-attached memory region.

6. The method of claim 4, further comprising inserting requestor fabric interface markers into an application during compilation in response to recognizing consistency primitives and consistency constructs.

7. The method of claim 4, wherein recognizing the selected memory access instructions is based on recognizing instructions in a predetermined list of instruction types and instruction prefixes associated with synchronization of data between threads.

8. The method of claim 1, further comprising, at each requestor authorized to access the fabric-attached memory region, maintaining a table of the requestors authorized to access the fabric-attached memory region and updating the table responsive to each of the notifications.

9. The method of claim 8, wherein the table comprises at least a fabric-attached memory region identifier and a number of compute requestors authorized to access the fabric-attached memory region.

10. A data processor comprising:
    a processing core executing an application;
    a fabric-attached memory interface coupled to the processing core and adapted to couple to a data fabric and fulfill memory access instructions from the processing core to a fabric-attached memory;
    a requestor-side adaptive consistency controller coupled to the processing core and the fabric-attached memory interface and operable to:
        request notifications from a fabric manager for the fabric-attached memory regarding changes in requestors authorized to access a fabric-attached memory region which the data processor is authorized to access; and
        responsive to a notification from the fabric manager indicating that more than one requestor is authorized to access the fabric-attached memory region, cause fences to be activated for selected memory access instructions in a local application.

11. The data processor of claim 10, wherein the requestor-side adaptive consistency controller further operates to, in response responsive to a notification from the fabric manager indicating that a single requestor is authorized to access the fabric-attached memory region, cause the fabric-attached memory region to be mapped as a write-back memory region.

12. The data processor of claim 11, wherein the requestor-side adaptive consistency controller further operates to, in response to the notification from the fabric manager indicating that more than one requestor is authorized to access the fabric-attached memory region:
    if the data processor is configured to issue local fence commands, cause local fence commands to be issued for the selected memory access instructions and mapping the fabric-attached memory region as write-through memory; and
    if the data processor is not configured to issue local fence commands, cause the fabric-attached memory region to be mapped as uncacheable.

13. The data processor of claim 10, further comprising processor instruction microcode stored in tangible non-transitory memory accessible by the processor core and executable by the processing core for recognizing the selected memory access instructions.

14. The data processor of claim 13, wherein the processor instruction microcode executes, responsive to recognizing the selected memory access instructions as indicating dependencies between requestors, to notify the requestor-side adaptive consistency controller of the recognized selected memory access instructions causing it to insert requestor-side fence commands into memory commands to the fabric-attached memory interface.

15. The data processor of claim 13, wherein recognizing the selected memory access instructions includes response to recognizing indicators in the local application comprising one of consistency primitives and consistency constructs.

16. The data processor of claim 13, wherein recognizing the selected memory access instructions includes recognizing fabric interface markers inserted into the application during compilation.

17. The data processor of claim 10, wherein the requestor-side adaptive consistency controller maintains a table of the requestors authorized to access the fabric-attached memory region and updates the table responsive to the notification.

18. The data processor of claim 17, wherein the table comprises at least a fabric-attached memory region identifier and a number of compute requestors authorized to access the fabric-attached memory region.

19. A fabric-attached memory system, comprising:
a fabric-attached memory;
a data fabric coupled to the fabric-attached memory;
a fabric manager coupled to the data fabric and operable to authorize and deauthorize requestors to access memory regions of the fabric-attached memory;
a plurality of data processors coupled to the data fabric, each including a processing core executing an application, a fabric-attached memory interface, and a requestor-side adaptive consistency controller coupled to the processing core and the fabric-attached memory interface and operable to:
request notifications from the fabric manager regarding changes in requestors authorized to access a fabric-attached memory region which the data processor is authorized to access; and
responsive to a notification from the fabric manager indicating that more than one requestor is authorized to access the fabric-attached memory region, cause fences to be activated for selected memory access instructions in a local application.

20. The fabric-attached memory system of claim 19, wherein the requestor-side adaptive consistency controller further operates to, in response responsive to a notification from the fabric manager indicating that a single requestor is authorized to access the fabric-attached memory region, cause the fabric-attached memory region to be mapped as a write-back memory region.

21. The fabric-attached memory system of claim 20, wherein each respective requestor-side adaptive consistency controller further operates to, in response to the notification from the fabric manager indicating that more than one requestor is authorized to access the fabric-attached memory region:
if the data processor of the respective requestor-side adaptive consistency controller is configured to issue local fence commands, cause local fence commands to be issued for the selected memory access instructions and mapping the fabric-attached memory region as write-through memory; and
if the data processor of the requestor-side adaptive consistency controller is not configured to issue local fence commands, cause the fabric-attached memory region to be mapped as uncacheable.

22. The fabric-attached memory system of claim 19, wherein each respective data processor comprises processor instruction microcode stored in tangible non-transitory memory accessible by a processor core of the respective data processor and executable by the processor core for recognizing the selected memory access instructions.

23. The fabric-attached memory system of claim 22, wherein the processor instruction microcode executes, responsive to recognizing the selected memory access instructions as indicating dependencies between requestors, to notify the requestor-side adaptive consistency controller of the recognized selected memory access instructions causing it to insert requestor-side fence commands into memory commands to the fabric-attached memory interface.

24. The fabric-attached memory system of claim 22, wherein recognizing the selected memory access instructions includes recognizing indicators in the local application comprising one of consistency primitives and consistency constructs.

25. The fabric-attached memory system of claim 22, wherein recognizing the selected memory access instructions includes recognizing fabric interface markers inserted into the application during compilation.

26. The fabric-attached memory system of claim 19, wherein the requestor-side adaptive consistency controller maintains a table of the requestors authorized to access the fabric-attached memory region and updates the table responsive to the notification.

27. The fabric-attached memory system of claim 26, wherein the table comprises at least a fabric-attached memory region identifier and a number of compute requestors authorized to access the fabric-attached memory region.

* * * * *